(12) United States Patent
Vogt et al.

(10) Patent No.: US 10,272,595 B2
(45) Date of Patent: *Apr. 30, 2019

(54) MOLDABLE UNCURED NONWOVEN COMPOSITE AND MOLDED CURED COMPOSITE

(71) Applicant: Milliken & Company, Spartanburg, SC (US)

(72) Inventors: Kirkland W. Vogt, Simpsonville, SC (US); Pradipkumar Bahukudumbi, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/165,530

(22) Filed: May 26, 2016

(65) Prior Publication Data

US 2017/0341272 A1 Nov. 30, 2017

(51) Int. Cl.
*B32B 5/02* (2006.01)
*B32B 5/06* (2006.01)
(Continued)

(52) U.S. Cl.
CPC ............ *B29B 11/16* (2013.01); *B29B 13/023* (2013.01); *B29C 51/004* (2013.01);
(Continued)

(58) Field of Classification Search
USPC ............... 427/208.2, 388.4, 381, 372.2, 342; 442/149, 150, 361, 362, 363, 364
See application file for complete search history.

(56) References Cited

U.S. PATENT DOCUMENTS 5,591,239 A * 1/1997 Larson .................... A47L 13/16
51/294
7,153,794 B2 12/2006 Wenstrup et al. ............ 442/415
(Continued)

FOREIGN PATENT DOCUMENTS

| EP | 1 873 291 | 1/2008 |
|---|---|---|
| JP | 2003 251730 | 1/2008 |
| WO | WO 2010/051004 | 5/2010 |

OTHER PUBLICATIONS

Patent Cooperation Treaty PCT International Search Report. dated, Aug. 1, 2017. International Application No. PCT/US2017/026064. International Filing Date, Apr. 5, 2017.

*Primary Examiner* — Lynda Salvatore
(74) *Attorney, Agent, or Firm* — Cheryl J. Brickey

(57) ABSTRACT

A process for forming a moldable, uncured nonwoven composite containing forming a outermost nonwoven layer, forming a structural nonwoven layer, needling the structural nonwoven layer and the outermost nonwoven layer together from both the outer surface of the outermost nonwoven layer and the second surface of the structural nonwoven layer, applying an uncured, water-based thermosetting resin having a cure temperature of at least about 160° C. to the second surface of the structural nonwoven layer, and at least partially drying the uncured, wet nonwoven composite. Heat and pressure may be applied to form the moldable, uncured composite. A moldable, uncured nonwoven composite and a molded, cured nonwoven composite are also disclosed.

13 Claims, 3 Drawing Sheets

(51) Int. Cl.
  *B32B 5/26* (2006.01)
  *B32B 7/08* (2019.01)
  *B29B 11/16* (2006.01)
  *B29B 13/02* (2006.01)
  *B29C 51/00* (2006.01)
  *B29C 70/08* (2006.01)
  *B29C 70/14* (2006.01)
  *B29C 70/54* (2006.01)
  *B29K 23/00* (2006.01)
  *B29K 33/04* (2006.01)
  *B29L 31/30* (2006.01)
  *D06M 17/04* (2006.01)
  *B29K 105/00* (2006.01)

(52) U.S. Cl.
  CPC ............ *B29C 70/081* (2013.01); *B29C 70/14* (2013.01); *B29C 70/545* (2013.01); *B32B 5/022* (2013.01); *B32B 5/06* (2013.01); *B32B 5/26* (2013.01); *B32B 7/08* (2013.01); *D06M 17/04* (2013.01); *B29K 2023/12* (2013.01); *B29K 2033/04* (2013.01); *B29K 2105/0085* (2013.01); *B29L 2031/3011* (2013.01); *B32B 2260/023* (2013.01); *B32B 2260/046* (2013.01); *B32B 2305/076* (2013.01); *D10B 2321/022* (2013.01); *D10B 2321/08* (2013.01)

(56) References Cited

U.S. PATENT DOCUMENTS

| | | | |
|---|---|---|---|
| 7,521,386 B2 | 4/2009 | Wenstrup et al. | 442/389 |
| 7,709,405 B2 | 5/2010 | Wenstrup et al. | 442/415 |
| 8,298,969 B2 | 10/2012 | Bahukudumbi | 442/281 |
| 8,322,487 B1 | 12/2012 | Kitchen et al. | 181/294 |
| 8,496,088 B2 | 7/2013 | Kitchen et al. | 181/290 |
| 9,144,955 B2 | 9/2015 | Jaffee | 442/67 |
| 2005/0160711 A1* | 7/2005 | Yang | B01D 39/1623 55/524 |
| 2011/0265939 A1 | 11/2011 | Nakagawa et al. | 156/148 |
| 2015/0064392 A1* | 3/2015 | Jaffee | B32B 5/12 428/113 |

* cited by examiner

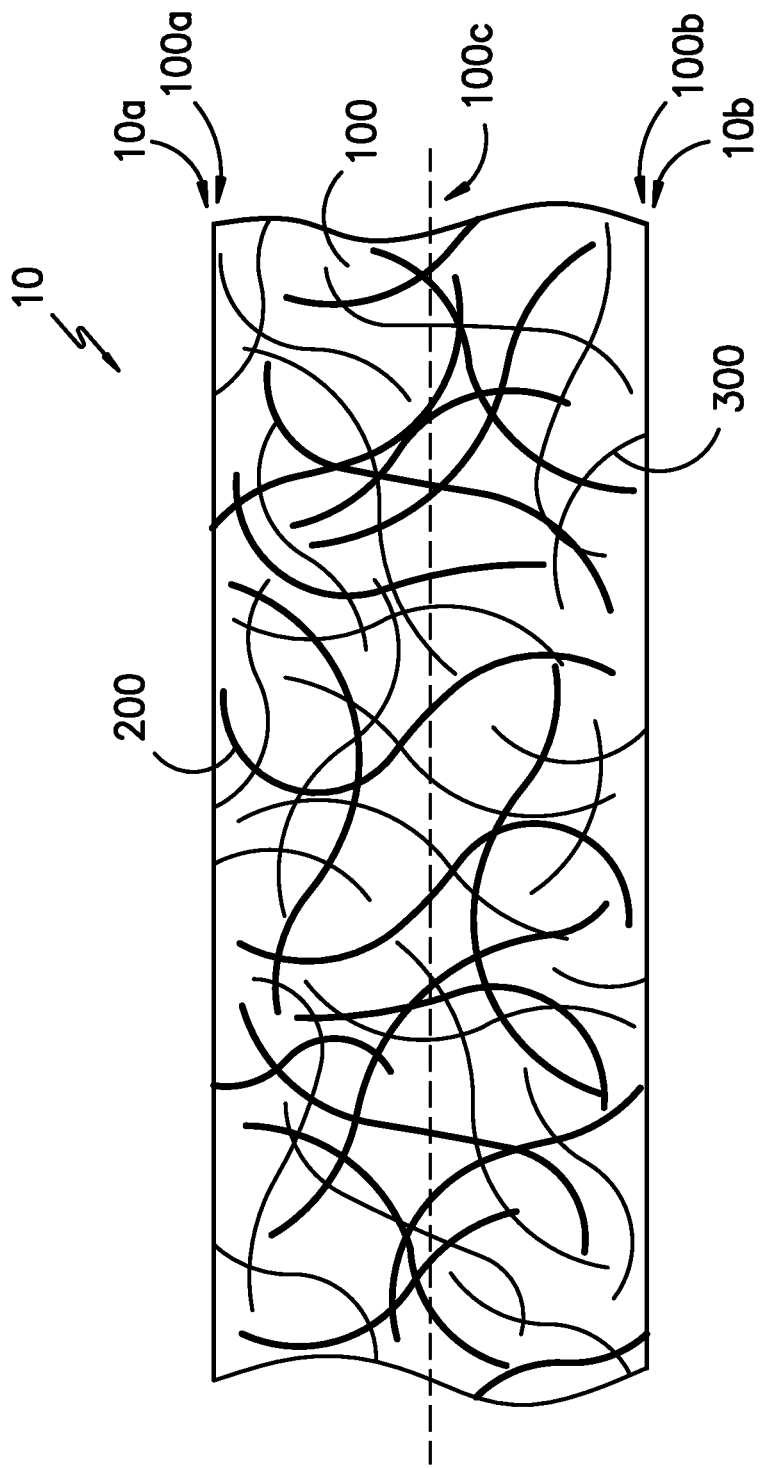
FIG. -1-

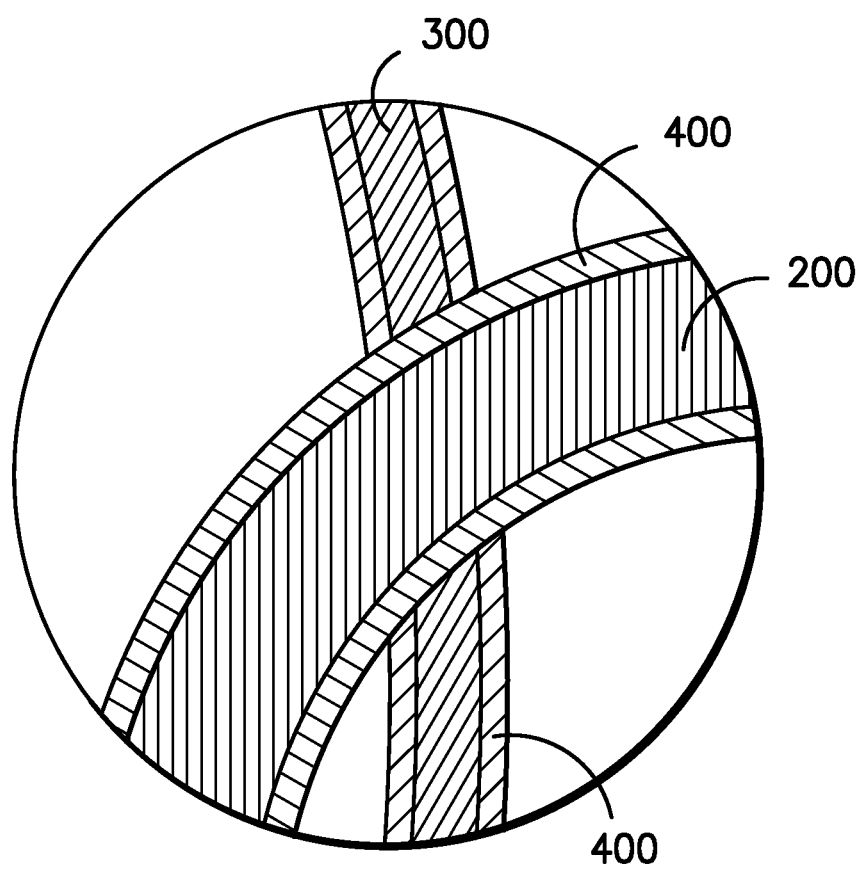
FIG. -2-

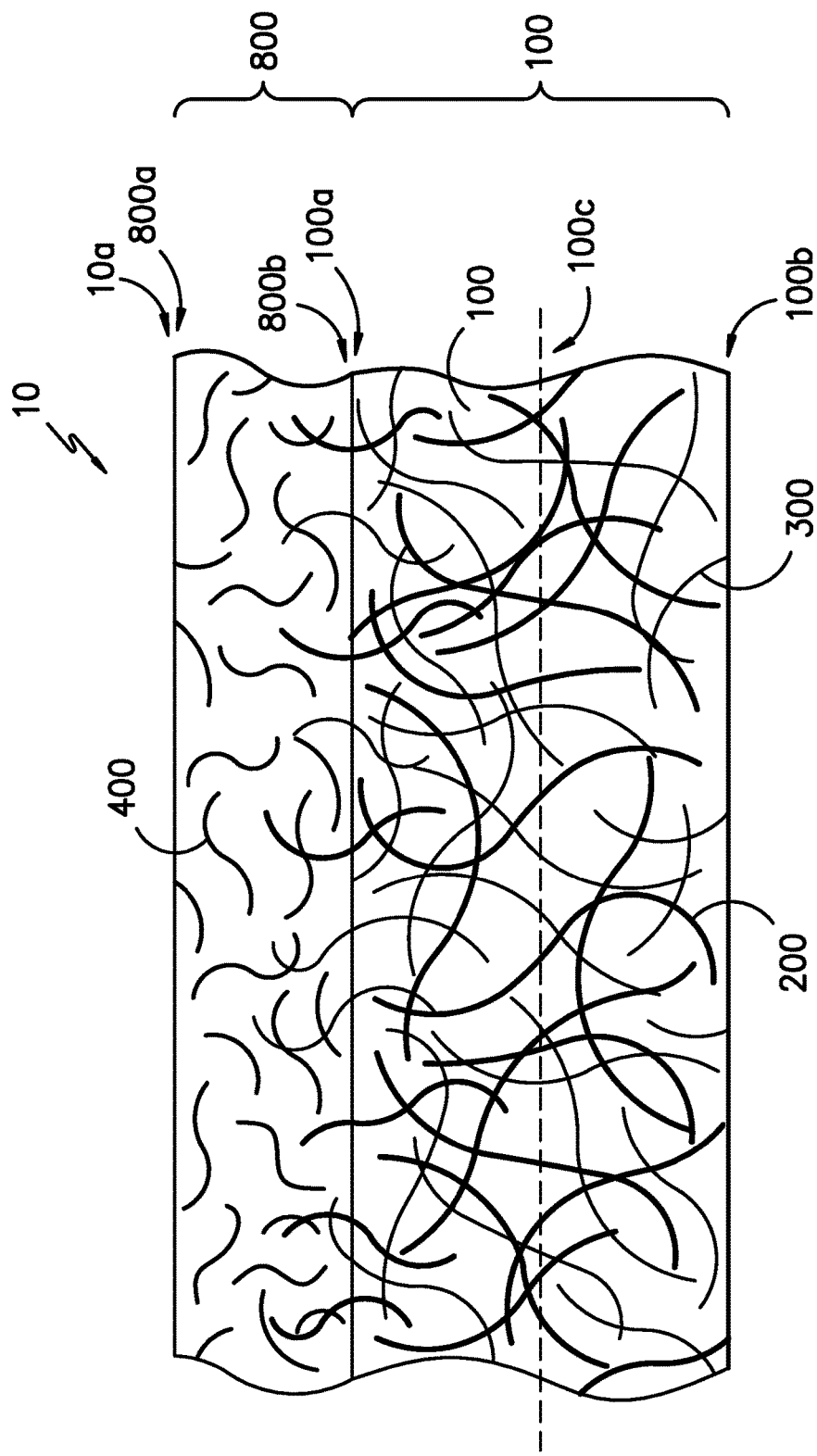
FIG. -3-

MOLDABLE UNCURED NONWOVEN COMPOSITE AND MOLDED CURED COMPOSITE

TECHNICAL FIELD OF THE INVENTION

The invention provides a moldable uncured nonwoven composite and a molded cured composite having good physical properties.

BACKGROUND

There are a number of products in various industries, including automotive, office and home furnishings, construction, and others; that require materials having a z-direction thickness to provide both structural strength as well as thermal, sound insulation, aesthetic, and/or other performance features. In many of these applications it is also required that the material be thermoformable to a specified shape and rigidity. In the automotive industry these products often are used for shielding applications such as noise and thermal barriers in automotive hood liners, underbody shields, firewall barriers, and trunk liners.

Composite materials used in automotive applications like package shelves, door panels or headliners are often produced via cold pressing structural nonwoven composite layers bound by a thermoplastic binder fiber to a decorative layer. For this, the composite layer used as substrate bound by thermoplastic binder is heated by means of infrared radiation to a temperature between 180° C. and 200° C., placed in a cold molding press together with a decorative layer, and cold pressed with the decorative layer. The composite layer can comprise by way of example polypropylene or polyester core-sheath binder fibers, and use natural fibers, glass or carbon fibers as the reinforcing fibers.

A disadvantage of these purely thermoplastic systems is that the weight per unit area of the composite substrate tends to be high in order to achieve the mechanical properties (modulus of elasticity and tensile modulus) required. In addition, the composite may have dimensional stability issues when the operating temperature exceeds the softening point of the thermoplastic binder.

As an alternative to this, it is possible to use composite layers bound by a thermosetting resin system, for example bound by an epoxy resin. Here, a moldable prepreg is produced and then molded via hot pressing in a heated mold.

It is the objective of this invention to provide a process which is simple to carry out for producing structural nonwoven composite materials with an A-surface face layer in one-step without the need for an adhesive or a separate lamination step. In addition, the invention uses a combination of thermoplastic binder fiber and a thermosetting resin to improve the mechanical properties of the composite and the dimensional stability at elevated temperatures. In one embodiment, thermoplastic binder fibers with grafted functional groups are used to improve the bond strength within the fiber network and improves the mechanical properties.

BRIEF SUMMARY OF THE INVENTION

A process for forming a moldable, uncured nonwoven composite containing forming a outermost nonwoven layer, forming a structural nonwoven layer, placing the structural nonwoven layer and the outermost nonwoven layer together such that the inner surface of the outermost nonwoven layer is adjacent the first surface of the structural nonwoven layer, needling the structural nonwoven layer and the outermost nonwoven layer together from both the outer surface of the outermost nonwoven layer and the second surface of the structural nonwoven layer, applying an uncured, water-based thermosetting resin having a cure temperature of at least about 160° C. to the second surface of the structural nonwoven layer, and at least partially drying the uncured, wet nonwoven composite.

The outermost nonwoven layer has an outer surface and an inner surface and the outermost nonwoven layer contains a plurality of first fibers which have a melting temperature greater than about 130° C. The structural nonwoven layer has a first surface, a second surface, and an inner plane located at the mid-plane between the first and second surface. The structural nonwoven layer contains a plurality of binder fibers and a plurality of reinforcing fibers. The needling causes a portion of the first fibers from the outermost nonwoven layer to migrate into the structural nonwoven layer and causes a portion of the structural fibers and the binder fibers from the structural nonwoven layer to migrate into the outermost nonwoven layer. Applying the uncured, water-based thermosetting resin partially impregnates the nonwoven layers forming an uncured, wet nonwoven composite and at least 90% by weight of the water-based thermosetting resin is located in the structural nonwoven layer. When at least partially drying the uncured, wet nonwoven composite, the temperature at the inner plane of the structural nonwoven layer is less than about 160° C. forming an moldable, uncured nonwoven composite. Heat and pressure may be added to the moldable, uncured nonwoven composite to form a molded cured composite.

A moldable, uncured nonwoven composite containing an outermost nonwoven layer and a structural nonwoven layer. The outermost nonwoven layer has an outer surface and an inner surface, where the outer surface of the outermost nonwoven layer forms the first side of the moldable, uncured nonwoven composite. The outermost nonwoven layer comprises a plurality of first fibers. The structural nonwoven layer has a first surface and a second surface, where the first surface of the structural nonwoven layer is on the inner surface of the outermost nonwoven layer. The structural nonwoven layer comprises a plurality of reinforcing fibers, a plurality of binder fibers, and an uncured, water-based thermosetting resin having a cure temperature of at least about 160° C. The outermost nonwoven layer and structural nonwoven layer are needled together through the outer surface of the outermost nonwoven layer and the second surface of the structural nonwoven layer such that the structural nonwoven layer further comprises a plurality of first fibers from the outermost nonwoven layer and the outermost nonwoven layer further contains a plurality of structural fibers and binder fibers from the structural nonwoven layer. At least 90% by weight of the water-based thermosetting resin of the moldable, uncured nonwoven composite is located in the structural nonwoven layer.

A molded, cured nonwoven composite containing an outermost nonwoven layer and a structural nonwoven layer. The outermost nonwoven layer has an outer surface and an inner surface, wherein the outer surface of the outermost nonwoven layer forms the first side of the moldable, uncured nonwoven composite and where the outermost nonwoven layer comprises a plurality of first fibers. The structural nonwoven layer has a first surface and a second surface, where the first surface of the structural nonwoven layer is on the inner surface of the outermost nonwoven layer and the structural nonwoven layer comprises a plurality of reinforcing fibers, binder material, and a cured, water-based thermosetting resin. The outermost nonwoven layer and structural nonwoven layer are needled together through the outer surface of the outermost nonwoven layer and the second surface of the structural nonwoven layer such that the structural nonwoven layer further contains a plurality of first fibers from the outermost nonwoven layer and the outermost nonwoven layer further contains a plurality of structural fibers and binder fibers from the structural nonwoven layer. At least 90% by weight of the cured, water-based thermosetting resin of the molded, cured nonwoven composite is located in the structural nonwoven layer. At least a portion of the reinforcing fibers are bonded to other reinforcing fibers through the binder material and cured thermoset resin.

BRIEF DESCRIPTION OF THE FIGURES

An embodiment of the present invention will now be described by way of example, with reference to the accompanying drawings.

FIG. 1 illustrates schematically a cross-section of one embodiment of the moldable, uncured nonwoven composite.

FIG. 2 illustrates schematically a cross-section of an enlarged section of the moldable, uncured nonwoven composite of FIG. 1.

FIG. 3 illustrates schematically a cross-section of one embodiment of the moldable, uncured nonwoven composite.

DETAILED DESCRIPTION OF THE INVENTION

Referring to FIG. 1, there is shown one embodiment of a moldable, uncured nonwoven composite 10. The moldable, uncured nonwoven composite 10 contains a structural nonwoven layer 100 having a first side 100a, a second side 100b, and an inner plane 100c located at the mid-plane between the first side 100a and the second side 100b. The structural nonwoven layer 100 is a unitary material where the inner plane 100c is not a distinct plane or an adhesive connecting two zones together, the inner plane 100c is simply a reference plane. Once the moldable, uncured nonwoven composite 10 is molded under heat and pressure, it becomes the molded, cured composite.

In one embodiment, the thickness of the structural nonwoven layer 100 is between about 2 mm and 10 mm, more preferably between about 3 mm and 6 mm. The thickness is defined as the distance between the first side 100a and the second sided 100b of the structural nonwoven layer 100. In one embodiment, the a real weight of the moldable, uncured nonwoven composite 10 is between about 500 and 1000 g/m², more preferably between about 500 and 800 g/m².

The process to form a moldable, uncured nonwoven composite 10 begins with forming the structural nonwoven layer comprising a plurality of reinforcing fibers 200 and binder fibers 300. The structural nonwoven layer 100 is formed by the steps of blending, carding, and needle punching the plurality of reinforcing fibers 200 and binder fibers 300. The reinforcing fibers 200 and binder fibers 300 may be located within the structural nonwoven layer in a generally uniform way or may be stratified meaning that the concentration of a particular fiber is higher on the first side 100a, second side 100b, and/or inner plane 100c.

The structural nonwoven layer comprises a plurality of reinforcing fibers 200. The reinforcement fibers 200 may be staple or continuous. Some examples of suitable reinforcement fibers include glass fibers, aramid fibers, and highly oriented polypropylene fibers, bast fibers, polyester fibers, and carbon fibers.

The reinforcement fibers also provide volume to the structural nonwoven layer 100. Additional examples of reinforcing fibers 200 would include fibers with high denier per filament (one denier per filament or larger), high crimp fibers, hollow-fill fibers, and the like. These fibers provide mass and volume to the material. Some examples of reinforcement fibers include polyester, polypropylene, and cotton, as well as other low cost fibers. Preferably, the bulking fibers have a denier greater than about 6 denier. In another embodiment, the bulking fibers have a denier greater than about 15 denier. The bulking fibers are preferably staple fibers. In one embodiment, the bulking fibers do not a circular cross section, but are fibers having a higher surface area, including but not limited to, segmented pie, 4DG, winged fibers, tri-lobal etc.

In one preferred embodiment, the reinforcement fibers comprise a natural fiber. In one preferred embodiment, the reinforcement fibers comprise a fiber selected from the group consisting of a bast fiber, a kenaf fiber, a fiberglass fiber, and mixtures thereof.

In one embodiment, the reinforcement fibers 200 may include fibers made from highly oriented polymers, such as gel-spun ultrahigh molecular weight polyethylene fibers (e.g., SPECTRA™ fibers from Honeywell Advanced Fibers of Morristown, N.J. and DYNEEMA™ fibers from DSM High Performance Fibers Co. of the Netherlands), melt-spun polyethylene fibers (e.g., CERTRAN™ fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kans.), and sintered polyethylene fibers (e.g., TENSYLON™ fibers from ITS of Charlotte, N.C.). Suitable reinforcement fibers also include those made from rigid-rod polymers, such as lyotropic rigid-rod polymers, heterocyclic rigid-rod polymers, and thermotropic liquid-crystalline polymers. Suitable reinforcement fibers 145 made from lyotropic rigid-rod polymers include aramid fibers, such as poly(p-phenyleneterephthalamide) fibers (e.g., KEVLAR™ fibers from DuPont of Wilmington, Del. and TWARON™ fibers from Teijin of Japan) and fibers made from a 1:1 copolyterephthalamide of 3,4'-diaminodiphenylether and p-phenylenediamine (e.g., TECHNORA™ fibers from Teijin of Japan). Suitable reinforcement fibers 145 made from heterocyclic rigid-rod polymers, such as p-phenylene heterocyclics, include poly(p-phenylene-2,6-benzobisoxazole) fibers (PBO fibers) (e.g., ZYLON™ fibers from Toyobo of Japan), poly(p-phenylene-2,6-benzobisthiazole) fibers (PBZT fibers), and poly[2,6-diimidazo[4,5-b:4',5'-e]pyridinylene-1,4-(2,5-dihydroxy)phenylen-e] fibers (PIPD fibers) (e.g., M5® fibers from DuPont of Wilmington, Del.). Suitable reinforcement fibers made from thermotropic liquid-crystalline polymers include poly(6-hydroxy-2-napthoic acid-co-4-hydroxybenzoic acid) fibers (e.g., VECTRAN™ fibers from Celanese of Charlotte, N.C.). Suitable reinforcement fibers also include boron fibers, silicon carbide fibers, alumina fibers, glass fibers, and carbon fibers, such as those made from the high temperature pyrolysis of rayon, polyacrylonitrile (e.g., OPF™ fibers from Dow of Midland, Mich.), and mesomorphic hydrocarbon tar (e.g., THORNEL™ fibers from Cytec of Greenville, S.C.). In another exemplary embodiment, the reinforcement fibers 200 may be selected from alkali resistant fibers such as e.g., polyvinyl alcohol (PVA) fibers, polypropylene fibers, polyethylene fibers, etc. In still another exemplary embodiment, reinforcement fibers 200 having an alkali resistant coating may be used such as e.g., PVC coated glass fibers.

The structural nonwoven layer 100 also contains binder fibers 300. The binder fibers are fibers that form an adhesion or bond with the other fibers. In one embodiment, the binder preferably are fibers that are heat activated. Examples of heat activated binder fibers are fibers that can melt at lower temperatures, such as low melt fibers, bi-component fibers, such as side-by-side or core and sheath fibers with a lower sheath melting temperature, and the like.

In one embodiment, the binder fibers are bi-component fibers containing at least 2 components (they may contain 3 or more). In one embodiment, the bi-component fibers awe a core/sheath fiber meaning the fibers contain a core comprising a core polymer and a sheath comprising a sheath polymer. The core polymer has a higher melting temperature than the sheath polymer. In one embodiment, the core polymer has a melting temperature of at least about 180° C. and the sheath polymer has a melting temperature of less than about 180° C. In another embodiment, the core polymer has a melting temperature of at least about 180° C. and the sheath polymer has a melting temperature of less than about 160° C. Preferably, the core/sheath fibers have a core polymer of polyester and a sheath polymer of a different polyester such that the core and sheath polymers meet the melting temperature limitations.

The binder fibers are preferably staple fibers. In one embodiment, after molding under heat and pressure, the binder fibers are still discernable fibers with the sheath and or core at least partially intact. In another embodiment, the core of the core/sheath fibers remains intact but the sheath of the core/sheath fibers lose their fiber shape and form a coating on surrounding material. In another embodiment, binder fibers almost completely lose their fiber shape and form a coating on surrounding materials (when consolidated).

In one embodiment, a majority of the reinforcement fibers 200 are oriented such that the fibers form an angle with the inner plane 100c of between about 0 and 25 degrees. In another embodiment, the reinforcement fibers 200 preferably are oriented generally in the z-direction (the z-direction is defined as the direction perpendicular to the inner plane 100c. The z-orientation of the reinforcement fibers 200 allows for increased thickness of the first zone 100. In this embodiment, preferably a majority of the third fibers 130 have a tangential angle of between about 25 and 90 degrees to the normal of midpoint plane between the first side 100a and the inner plane 100c. This means that if a tangent was drawn on the reinforcement fibers 200 at the inner plane 100c, the angle formed would be between about 90 degrees and 25 degrees.

As the structural nonwoven layer is formed (before the introduction of the uncured, water-based thermosetting resin), the % by weight ratios of reinforcement fibers to binder fibers is between about 50:50 to 90:10, more preferably between about 60:40 to 70:30. As the structural nonwoven layer is formed (before the introduction of the uncured, water-based thermosetting resin), the structural nonwoven layer preferably comprises between about 10 and 50% by weight of binder fibers, more preferably between about 30 and 40%. As the structural nonwoven layer is formed (before the introduction of the uncured, water-based thermosetting resin), the structural nonwoven layer preferably comprises between about 50 and 95% by weight of reinforcing fibers, more preferably between about 60 and 60.

After the structural nonwoven layer 100 is formed, it is at least partially impregnated with an uncured, water-based thermosetting resin. The resin has a cure temperature of at least about 130° C., more preferably about 160° C.

In one embodiment, suitable resins are commercially available for example as aqueous dispersions of a polycarboxylic acid and/or styrene-acrylic polymer modified with a polycarboxylic acid and a polyol as crosslinking component, such as ACRODUR™ from BASF Company, Ludwigshafen, Germany. Preferred grades include styrene-acrylic polymer ACRODUR™ DS 3515 characterized by a solids content of about 50 weight percent, a pH of about 3.5 and a viscosity of about 150-300 mPa·s; ACRODUR™ DS 3530 characterized by solids content of about 50 weight percent, a pH of about 3.5 and a viscosity of about 150-300 mPas; ACRODUR™ DS 3558 characterized by a solids content of about 50 weight percent, a pH of about 3.5 and a viscosity of about 300-1500 mPa·s; and ACRODUR™ 950L characterized by a solids content of about 50 weight percent, a pH of about 3.5 and a viscosity of about 900-2500 mPa·s. In the preferred embodiment, additives like surfactants, pigments, activated carbon and biocides can be added to the resin bath before impregnating the structural nonwoven.

Aqueous resins are preferred over solvent based resin systems for environmental reasons and higher costs associated with solvent handling and recovery.

The process for preparing the composite article may include a step of impregnating the structural nonwoven with the flowable polymer. For example, a mat of natural fibers and binder fibers may be impregnated by the polymer or polymer solution. Preferably the natural fibers (e.g., the mat of natural fibers includes a sufficient amount of open spaces, and the polymer solution includes a sufficient amount of water so that the polymer solution can flow into the open spaces (e.g. to form an impregnated mat or prepreg).

The process for preparing the composite article may include a step of partially drying the impregnated structural nonwoven (e.g. the impregnated mat) to form partially dried impregnated prepreg. Drying the impregnated prepreg may reduce the water concentration of the impregnated fibers, partially cure the polymer, or both. The partially dried impregnated prepreg preferably is sufficiently dried to reduce the water concentration and/or partially cure the polymer so that it can be handled as a solid, so that the polymer does not flow out of the fibers, or both.

In one embodiment, the core fibers, binder fibers (and binder material in the cured composite), and resin all comprise polyester. Monomaterial compositions (material comprising the same polymer type) tend to eliminate chemical compatibility/bonding issues. In addition, constructions using the same material type can be more easily recycled and reused at end of life.

In one embodiment, the reinforcing fibers are cellulosic fibers, preferably bast fibers. As polysaccharides, these fibers have hydroxyl groups attached to the polymer backbone of the fibers, available for crosslinking. In one embodiment, the binder fibers comprise a thermoplastic polymer having maleic anhydride repeat units grafted onto the thermoplastic polymer. These anhydride groups are reactive with protic compounds that contain hydroxyl groups, amine groups, or aromatic rings. A portion of the anhydride groups may be opened with water in the environment to give carboxylic acid groups. Preferably, the water based thermosetting resin is selected such that when the resin is cured, it reacts and covalently bonds with the cellulosic fibers and/or the binder fibers comprise a thermoplastic polymer having maleic anhydride repeat units graphed onto the thermoplastic polymer. In one embodiment, the thermosetting resin is a blend of: a compound containing two or more carboxylic acid groups, a compound containing two or more hydroxyl groups, and optionally a catalyst that promotes the condensation reaction between carboxylic and hydroxyl groups. When heat is applied, the carboxylic acid and hydroxyl groups undergo a condensation reaction to form an ester-crosslinked system. The components of the thermosetting resin, and cellulosic fibers are crosslinked together through the ester forming process. Additionally, the anhydride groups of the binder fibers (in one embodiment) can react with the hydroxyl groups of the cellulose and the hydroxyl groups of the thermosetting resin to provide a second crosslinking method.

Next, the uncured, wet nonwoven layer is at least partially dried forming the moldable, uncured composite. This drying occurs such that the temperature at the inner plane is less than about 130° C., more preferably less than about 110° C. Keeping the temperature at the inner plane below this temperature is important so as not to cure the resin at this step. Preferably, the drying of the uncured, wet nonwoven layer results in removing between about 90 and 95% by weight of the water from the water-based thermosetting resin.

Preferably, the drying of the uncured, wet nonwoven layer comprises using superheated steam. Steam has a higher heat capacity than air, and is therefore naturally a better heating medium. The problem with steam is that it must remain above a certain temperature, or it will start to condense back into water. This is problematic in drying, because moisture pulled from the material naturally cools the heating medium. So if saturated steam were to be used, it would quickly condense and rain in the drum, because steam is so close to the temperature at which it condenses. This problem is avoided by using superheated steam as the drying medium. Superheated steam also allows for the impregnated structural nonwoven to be dried without initiating cross-linking/curing of the resin.

The resin 400 is not shown in FIG. 1 due to the difficulty showing such a thin coating on the fibers 200, 300. FIG. 2 is an enlargement of a section of the cross-section of FIG. 1 where the coating of the uncured, water-based thermosetting resin 400 can be seen on the fibers 200, 300. The coating may be so thin that in some embodiments, the coating may only be present at the fiber crossover locations instead of showing up as a true coating.

After the majority of the water is driven off, the moldable, uncured composite comprises between about 5 and 50% by weight resin, more preferably between about 5 and 40% by weight resin. After the majority of the water is driven off, the moldable, uncured composite comprises between about 25 and 40% by weight binder, more preferably between about 25 and 40% by weight resin.

This moldable, uncured composite differs from some other thermoset resin and fiber composites where the resin is the continuous component with some fibers suspended in the resin. In this moldable, uncured composite the majority of the composite is fibers with the resin forming a coating on the fibers. Preferably, the resin is not continuous throughout the composite.

The moldable, uncured composite 10 is preferably still flexible. This means that the moldable, uncured composite 10 is able to be completely folded onto itself (a 180 degree fold) and then can be unfolded without any permanent changes in appearance or physical properties. This flexibility is important for the composite to be used in certain applications like in molded parts for cars.

Next, the moldable, uncured nonwoven composite 10 may be cut into a desired shape and size and the cured. To cure the moldable, uncured nonwoven composite 10 into a molded, cured composite, heat and optionally pressure is applied to the moldable, uncured nonwoven composite 10 heating the uncured composite to a temperature of at least about 160° C. (measured at the inner plane of the structural nonwoven layer). This melts at least partially melts the binder fibers and cures the thermosetting resin bonding at least a portion of the reinforcing fibers to other reinforcing fibers. In the cured composite, at least a portion of the binder fibers may still have a fibrous shape with the other fibers melting into binder material (the binder material typically coating the reinforcing fibers or forming adhesive blobs).

In the embodiment where the binder fibers are bi-component fabric containing a core and sheath, preferably the sheath of the fibers melts while the core of the fibers remains (in a fibrous form). Preferably, the sheath polymer and cured thermoset resin bonds at least a portion of the reinforcing fibers to other reinforcing fibers, at least a portion of the reinforcing fibers to the core of the bi-component fibers, and least a portion of the cores of the bi-component fibers to other cores of the bi-component fibers.

The molded, cured nonwoven composite preferably is less flexible than the uncured nonwoven composite. Preferably, the molded, cured nonwoven composite is stiff enough to support its own weight, hold its own shape, and may even be stiff enough to support additional weight without changing its shape. In one embodiment, the molded, cured nonwoven composite has a maximum flexural lead of at least 28 N.

In one embodiment, the moldable, uncured nonwoven composite 10 (and the molded, cured composite 20) contains additional fibers. The additional fibers may be uniformly distributed throughout the structural nonwoven layer 100 or may have a stratified concentration. These additional fibers may include, but are not limited to additional binder fibers having a different denier, staple length, composition, or melting point, additional bulking fibers having a different denier, staple length, or composition, and an effect fiber, providing benefit a desired aesthetic or function. These effect fibers may be used to impart color, chemical resistance (such as polyphenylene sulfide fibers and polytetrafluoroethylene fibers), moisture resistance (such as polytetrafluoroethylene fibers and topically treated polymer fibers), or others.

In one embodiment, the additional fibers may be heat and flame resistant fibers, which are defined as fibers having a Limiting Oxygen Index (LOI) value of 20.95 or greater, as determined by ISO 4589-1. Examples of heat and flame resistant fibers include, but are not limited to the following: fibers including oxidized polyacrylonitrile, aramid, or polyimid, flame resistant treated fibers, FR rayon, carbon fibers, or the like. These heat and flame resistant fibers may also act as the bulking fibers or may be used in addition to the bulking fibers.

All of the fibers within the moldable, uncured nonwoven composite 10 (and the molded, cured composite 20) may optionally contain additives. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

In one embodiment, the moldable, uncured nonwoven composite 10 (and the molded, cured composite 20) may contain an additional nonwoven layer. The additional nonwoven layer may be exactly same as the structural nonwoven layer 100 or may have different fibers, densities, and ratios. The properties described in relation to the structural nonwoven layer 100 are applicable to the additional nonwoven layer. The additional nonwoven layer(s) may be attached to one or both sides of the structural nonwoven layer 100 by any suitable means such as needling or adhesives.

Referring now to FIG. 3, there is shown another embodiment where the moldable, uncured nonwoven composite 10 contains the structural layer 100 (as described above) and an outermost layer 800. The outermost nonwoven layer 800 has an outer surface 800*a* and an inner surface 800*b*. The outermost nonwoven layer and the structural nonwoven layer are placed together such that the outer surface 800*a* of the outermost nonwoven layer 800 forms the first side 10*a* of the composite 10 and the second surface 100*b* of the structural layer 100 forms the second side 10*b* of the composite 10. The inner surface 800*b* of the outermost nonwoven layer 800 is next to and adjacent the first surface 100*a* of the structural nonwoven layer 100. The two nonwoven layers 100, 800 may be in direct contain (they would be in intimate contact with no other material between them) or there may be additional material between the two layers (such as an adhesive, a film, an additional nonwoven, or a woven or knit fabric).

The outermost nonwoven layer 800 contains a plurality of first fibers which have a melting temperature greater than 130° C. The A surface layer can comprise a nonwoven, knit or a woven product. In a preferred embodiment, the A surface comprises a needlepunch nonwoven layer. The nonwoven contains PET or PP staple fibers that are color matched to an OEM (original equipment manufacturer) specified master. The typical weights of the nonwoven layer are between 150 gsm and 400 gsm. The typical thickness of the A layer is between 500 microns and 1.5 mm.

The A surface layer can comprise a nonwoven, knit or a woven product. In the preferred embodiment, the A surface comprises a needlepunch nonwoven layer. The nonwoven contains PET or PP staple fibers that are color matched to an OEM specified master. The typical weights of the nonwoven layer are between 150 gsm and 400 gsm. The typical thickness of the A layer is between 500 microns and 1.5 mm. In one embodiment, the outermost nonwoven layer 800 may contain a plurality of binder fibers (which may be the same or different binder fibers than in the structural nonwoven layer 100), or other binder material.

The structural nonwoven layer 100 and the outermost nonwoven layer 800 are needled together from both the outer surface of the outermost nonwoven layer and the second surface of the structural nonwoven layer, wherein the needling causes a portion of the first fibers from the outermost nonwoven layer to migrate into the structural nonwoven layer and causes a portion of the structural fibers and the binder fibers from the structural nonwoven layer to migrate into the outermost nonwoven layer.

When the uncured, water-based thermosetting resin having a cure temperature of at least about 160° C. is applied to the embodiment of the composite 10 shown in FIG. 3, the resin is applied to the second surface 100*b* of the structural nonwoven layer 100, partially impregnating the nonwoven layers 100, 800 forming an uncured, wet nonwoven composite, wherein at least 90% by weight of the water-based thermosetting resin is located in the structural nonwoven layer 100. Preferably, at least 95% by weight of the water-based thermosetting resin is located in the structural nonwoven layer 100. In another embodiment, essentially no (less than 1% by weight) of the thermosetting resin is on the outermost surface 800*a* of the outermost nonwoven layer 800.

The layered composite is impregnated from the bottom side with the thermosetting resin. Preferred impregnation equipment is a parabolic foam coater or a rotary screen coater. The penetration of the resin stops at the interface of the structural and aesthetic layers. This can be controlled with the process and/or the structure of the layered composite. When controlled with the process, the applicator pressure and resin concentration must control the penetration of the resin so that it does not penetrate too far into the A-substrate. If it penetrates too far, the touch, feel, and appearance of the A-surface suffers.

Additionally, a "penetration stop layer" can be built into the substrate. Some example layers include a film, spunbond nonwoven, or a coating of cationic-containing polymer applied to the interface before needlepunching them together, capable of coagulating anionically stabilized thermosetting resin latex. With these layers, the latex saturates the structural layer but stops penetration at the interface, leaving the face layer with a natural feel and look.

While it is theoretically possible to impregnate the structural nonwoven and then needle-in the face layer, there are process challenges that would cause a) greater needle breakage as a result of the stiffness of the impregnated structural layer and 2) distorting the appearance of the face layer during the composite step.

The cured or uncured composite may also contain any additional layers for physical or aesthetic purposes. Suitable additional layers include, but are not limited to, a non-woven fabric, a woven fabric, a knitted fabric, a foam layer, a film, a paper layer, an adhesive-backed layer, a foil, a mesh, an elastic fabric (i.e., any of the above-described woven, knitted or non-woven fabrics having elastic properties), an apertured web, an adhesive-backed layer, or any combination thereof. Other suitable additional layers include, but are not limited to, a color-containing layer (e.g., a print layer); one or more additional sub-micron fiber layers having a distinct average fiber diameter and/or physical composition; one or more secondary fine fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof. The additional layers may be on either or both sides of the non-woven composite. For example, a textile may be applied to one side of the non-woven composite using an optional adhesive layer to form an aesthetic surface for an end use such as certain automobile applications.

The cured or uncured composite may further comprise one or more attachment devices to enable the composite to be attached to a substrate or other surface. In addition to adhesives, other attachment devices may be used such as mechanical fasteners like screws, nails, clips, staples, stitching, thread, hook and loop materials, etc.

The one or more attachment devices may be used to attach the composite to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

EXAMPLES

The invention will now be described with reference to the following non-limiting examples, in which all parts and percentages are by weight unless otherwise indicated.

Example 1

Example 1 was a structural non-woven fiber based composite comprising a first side and a second side. The non-woven layer was formed from a blend of two fibers and had a basis weight of 700 gram/m$^2$:
1) 20% by weight of a 4 denier polyester core-180 C co-polyester sheath fiber.
2) 80% by weight of a triple-carded kenaf (bast) fiber which had a linear density of approximately 8.$\overline{8}$-2 dtex (8-18 denier)

The structural nonwoven layer was produced using a standard industrial scale needle punch carpet production line. Staple fibers as indicated above were mixed and formed in a mat using carding and cross-lapping. The mat was pre-needled using plain barbed needles to form the non-woven layers. The structural nonwoven layer was impregnated with ACRODUR™ DS3515 using a Gaston county parabolic foam coater. The impregnated nonwoven composite was dried in a RF oven until the residual moisture level is 15%. The dry add-on weight of the ACRODUR™ resin was 42% (294 gsm) of the structural nonwoven layer.

Example 2

Example 1 was consolidated using a heated platen press, with the platen temperatures set at 400° F. to melt the low-melt binder fibers and cross-link the ACRODUR™ DS3515 resin. The cycle time was 45 seconds and the consolidated non-woven composite had a thickness of 2.5 mm. The application of heat and pressure allows the low-melt binder fiber and ACRODUR™ resin to bond the reinforcing fibers together.

Example 3

Example 3 was a structural non-woven fiber based composite comprising a first side and a second side. The non-woven layer was formed from a blend of two fibers and had a basis weight of 700 gram/m$^2$:
1) 50% by weight of a 8 denier PP fiber that had been grafted with approximately 10 wt. % maleic anhydride (MAH).
2) 50% by weight of a triple-carded kenaf (bast) fiber which had a linear density of approximately 8.$\overline{8}$-2 dtex (8-18 denier)

The structural nonwoven layer was produced using a standard industrial scale needle punch carpet production line. Staple fibers as indicated above were mixed and formed in a mat using carding and cross-lapping. The mat was pre-needled using plain barbed needles to form the non-woven layers. The structural nonwoven layer was impregnated with ACRODUR™ DS3515 using a Gaston county parabolic foam coater. The impregnated nonwoven composite was dried in a RF oven until the residual moisture level is 15%. The dry add-on weight of the ACRODUR™ resin was 42% (294 gsm) of the structural nonwoven layer.

Example 4

Example 3 was consolidated using a heated platen press, with the platen temperatures set at 400° F. to melt the low-melt binder fibers and cross-link the ACRODUR™ DS3515 resin. The cycle time was 45 seconds and the consolidated non-woven composite had a thickness of 2.5 mm. The application of heat and pressure allows the PP binder fiber and ACRODUR™ resin to bond the reinforcing fibers together. The MAH groups on the PP fiber covalently bond to the hydroxyl groups on the kenaf fibers and the ACRODUR™ resin.

Example 5

Example 5 was a structural non-woven fiber based composite comprising a first zone and a second zone. The non-woven layer forming the first zone was formed from a blend of two fibers and had a basis weight of 150 gram/m$^2$:
1) 95% by weight of a 6 denier PET staple fiber.
2) 5% by weight of a 4 denier (4.4 decitex) low melt binder fiber. The fiber is a core-sheath polyester fiber with a lower melting temperature sheath.

The non-woven layer was formed from a blend of two fibers and had a basis weight of 700 gram/m$^2$:
1) 20% by weight of a 4 denier polyester core-180 C co-polyester sheath fiber.
2) 80% by weight of a triple-carded kenaf (bast) fiber which had a linear density of approximately 8.$\overline{8}$-2 dtex (8-18 denier)

The non-woven layers forming the zones were produced using a standard industrial scale needle punch carpet production line. Staple fibers as indicated above were mixed and formed in a mat using carding and cross-lapping. The mat was pre-needled using plain barbed needles to form the non-woven layers. The first zone (first non-woven) and second zone (second non-woven) were then needled together using a needle-loom from the first zone side of the non-woven. The needling pushed fibers from the first zone into the second zone and essentially no fibers from the second zone were in the first zone. The structural nonwoven layer was impregnated with ACRODUR™ DS3515 using a Gaston county parabolic foam coater. The pressure and concentration of the resin was tuned to limit the depth of penetration of the resin. The impregnated nonwoven composite was dried at a temperature of 90 C in a convection tenter oven until the residual moisture level is 15%. The dry add-on weight of the ACRODUR™ resin was 35% (245 gsm) of the structural nonwoven layer.

Example 6

Example 5 was consolidated using a heated platen press, with the platen temperatures set at 400° F. to melt the low-melt binder fibers and cross-link the ACRODUR™ DS3515 resin. The cycle time was 45 seconds and the consolidated non-woven composite had a thickness of 3.2 mm. The application of heat and pressure allows the low-melt binder fiber and ACRODUR™ resin to bond the reinforcing fibers together.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A process for forming a moldable, uncured nonwoven composite having a first side and a second side comprising:
   forming a outermost nonwoven layer having an outer surface and an inner surface, wherein the outermost nonwoven layer comprises a plurality of first fibers, wherein the first fibers have a melting temperature greater than about 130° C.;
   forming a structural nonwoven layer having a first surface, a second surface, and an inner plane located at the mid-plane between the first and second surface, wherein the structural nonwoven layer comprises a plurality of binder fibers and a plurality of reinforcing fibers;
   placing the structural nonwoven layer and the outermost nonwoven layer together such that the inner surface of the outermost nonwoven layer is adjacent the first surface of the structural nonwoven layer and the outer surface of the outermost nonwoven layer forms the first side of the moldable, uncured nonwoven composite;
   needling the structural nonwoven layer and the outermost nonwoven layer together from both the outer surface of the outermost nonwoven layer and the second surface of the structural nonwoven layer, wherein the needling causes a portion of the first fibers from the outermost nonwoven layer to migrate into the structural nonwoven layer and causes a portion of the structural fibers and the binder fibers from the structural nonwoven layer to migrate into the outermost nonwoven layer;
   applying an uncured, water-based thermosetting resin having a cure temperature of at least about 160° C. to the second surface of the structural nonwoven layer, partially impregnating the nonwoven layers forming an uncured, wet nonwoven composite, wherein at least 90% by weight of the water-based thermosetting resin is located in the structural nonwoven layer; and,
   at least partially drying the uncured, wet nonwoven composite such that the temperature at the inner plane of the structural nonwoven layer is less than about 160° C. forming a moldable, uncured nonwoven composite.

2. The process of claim 1, wherein the outermost nonwoven layer further comprises a plurality of binder fibers.

3. The process of claim 1, wherein the binder fibers in the structural nonwoven layer are bi-component fibers comprising a core and a sheath, wherein the core comprises a polymer having a melting temperature of at least about 190° C. and the sheath comprises a polymer having a melting temperature less than about 190° C.

4. The process of claim 1, further comprising placing an adhesive between the inner surface of the outermost nonwoven layer and first surface of the structural nonwoven layer before or during the step of placing the structural nonwoven layer and the outermost nonwoven layer together.

5. The process of claim 1, wherein drying the uncured, wet nonwoven composite comprises removing between 90 and 95% of the water.

6. The process of claim 1, wherein the binder material and the water-based thermosetting resin comprise polyester.

7. A moldable, uncured nonwoven composite formed by the process of claim 1.

8. A process for forming a molded, cured nonwoven composite having a first side and a second side comprising:
   forming a outermost nonwoven layer having an outer surface and an inner surface, wherein the outermost nonwoven layer comprises a plurality of first fibers, wherein the first fibers have a melting temperature greater than about 130° C.;
   forming a structural nonwoven layer having a first surface, a second surface, and an inner plane located at the mid-plane between the first and second side, wherein the structural nonwoven layer comprises a plurality of binder fibers and a plurality of reinforcing fibers;
   placing the structural nonwoven layer and the outermost nonwoven layer together such that the inner surface of the outermost nonwoven layer is adjacent the first surface of the structural nonwoven layer and the outer surface of the outermost nonwoven layer forms the first side of the moldable, uncured nonwoven composite;
   needling the structural nonwoven layer and the outermost nonwoven layer together from both the outer surface of the outermost nonwoven layer and the second surface of the structural nonwoven layer, wherein the needling causes a portion of the first fibers from the outermost nonwoven layer to migrate into the structural nonwoven layer and causes a portion of the structural fibers and the binder fibers from the structural nonwoven layer to migrate into the outermost nonwoven layer;

applying an uncured, water-based thermosetting resin having a cure temperature of at least about 160° C. to the second surface of the structural nonwoven layer, partially impregnating the nonwoven layers forming an uncured, wet nonwoven composite, wherein at least 90% by weight of the water-based thermosetting resin is located in the structural nonwoven layer;

at least partially drying the uncured, wet nonwoven composite such that the temperature at the inner plane of the structural nonwoven layer is less than about 160° C. forming an moldable, uncured nonwoven composite;

cutting the moldable, uncured nonwoven composite; and, applying heat and pressure to the moldable, uncured nonwoven composite to a temperature of at least about 160° C. at least partially melting the binder fibers and bonding at least a portion of the reinforcing fibers together and at least partially curing the thermosetting resin forming the molded, cured nonwoven composite.

9. The process of claim 8, wherein the binder fibers in the structural nonwoven layer are bi-component fibers comprising a core and a sheath, wherein the core comprises a polymer having a melting temperature of at least about 160° C. and the sheath comprises a polymer having a melting temperature less than about 160° C.

10. The process of claim 8, further comprising placing an adhesive between the inner surface of the outermost nonwoven layer and first surface of the structural nonwoven layer before or during the step of placing the structural nonwoven layer and the outermost nonwoven layer together.

11. The process of claim 8, wherein drying the uncured, wet nonwoven composite comprises removing between 90 and 95% of the water.

12. The process of claim 8, wherein the binder material and the water-based thermosetting resin comprise polyester.

13. A molded, cured nonwoven composite formed by the process of claim 8.

* * * * *